US010326969B2

(12) United States Patent
Wierich

(10) Patent No.: US 10,326,969 B2
(45) Date of Patent: Jun. 18, 2019

(54) VEHICLE VISION SYSTEM WITH REDUCTION OF TEMPORAL NOISE IN IMAGES

(71) Applicant: MAGNA ELECTRONICS INC., Auburn Hills, MI (US)

(72) Inventor: Thomas Wierich, Butzbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 1035 days.

(21) Appl. No.: 14/456,162

(22) Filed: Aug. 11, 2014

(65) Prior Publication Data
US 2015/0042806 A1 Feb. 12, 2015

Related U.S. Application Data

(60) Provisional application No. 61/919,138, filed on Dec. 20, 2013, provisional application No. 61/864,835, filed on Aug. 12, 2013.

(51) Int. Cl.
*H04N 5/235* (2006.01)
*H04N 7/18* (2006.01)
*H04N 9/64* (2006.01)
*G06T 5/00* (2006.01)
*G06T 5/50* (2006.01)
*H04N 5/365* (2011.01)
*H04N 9/04* (2006.01)
*H04N 5/217* (2011.01)

(52) U.S. Cl.
CPC ............ *H04N 9/646* (2013.01); *G06T 5/002* (2013.01); *G06T 5/50* (2013.01); *H04N 5/3658* (2013.01); *G06T 2207/10016* (2013.01); *G06T 2207/10024* (2013.01); *H04N 5/217* (2013.01); *H04N 9/045* (2013.01)

(58) Field of Classification Search
CPC . G06T 2207/10016; G06T 2207/10024; G06T 5/002; G06T 5/50; H04N 5/217; H04N 5/3658; H04N 9/045; H04N 9/646
USPC .......................................................... 348/148
See application file for complete search history.

(56) References Cited

U.S. PATENT DOCUMENTS

| 4,987,357 A | 1/1991 | Masaki |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |

(Continued)

*Primary Examiner* — Deirdre L Beasley
(74) *Attorney, Agent, or Firm* — Honigman LLP

(57) ABSTRACT

A vision system of a vehicle includes a camera disposed at a vehicle and having a field of view exterior of the vehicle. The camera includes an imaging array having rows and columns of photosensing elements that may include red light sensing elements, green light sensing elements and blue light sensing elements. An image processor is operable to process image data captured by the camera. A display is disposed in the vehicle and viewable by a driver of the vehicle and is operable to display images derived from captured image data. Responsive to image processing of captured image data by the image processor, temporal noise in images derived from captured image data is reduced by determining a change in luminance of photosensing elements from a first frame of captured image data to a second frame of captured image data.

20 Claims, 12 Drawing Sheets

(56) References Cited

U.S. PATENT DOCUMENTS

| | | |
|---|---|---|
| 5,027,200 A | 6/1991 | Petrossian et al. |
| 5,059,877 A | 10/1991 | Teder |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,880,777 A * | 3/1999 | Savoye ............... H04N 5/20 257/229 |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,201,642 B1 | 3/2001 | Bos et al. |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |

(56) References Cited

U.S. PATENT DOCUMENTS

| | | | |
|---|---|---|---|
| 6,523,976 B1 | 2/2003 | Turnbull et al. | |
| 6,534,884 B2 | 3/2003 | Marcus et al. | |
| 6,535,617 B1* | 3/2003 | Hannigan | G06K 7/1417 |
| | | | 348/615 |
| 6,539,306 B2 | 3/2003 | Turnbull | |
| 6,553,130 B1 | 4/2003 | Lemelson et al. | |
| 6,593,960 B1 | 7/2003 | Sugimoto et al. | |
| 6,594,583 B2 | 7/2003 | Ogura et al. | |
| 6,611,610 B1 | 8/2003 | Stam et al. | |
| 6,636,258 B2 | 10/2003 | Strumolo | |
| 6,672,731 B2 | 1/2004 | Schnell et al. | |
| 6,690,268 B2 | 2/2004 | Schofield et al. | |
| 6,704,621 B1 | 3/2004 | Stein et al. | |
| 6,711,474 B1 | 3/2004 | Treyz et al. | |
| 6,735,506 B2 | 5/2004 | Breed et al. | |
| 6,744,353 B2 | 6/2004 | Sjönell | |
| 6,747,766 B1 | 6/2004 | Kamisuwa et al. | |
| 6,795,221 B1 | 9/2004 | Urey | |
| 6,806,452 B2 | 10/2004 | Bos et al. | |
| 6,819,231 B2 | 11/2004 | Berberich et al. | |
| 6,823,241 B2 | 11/2004 | Shirato et al. | |
| 6,824,281 B2 | 11/2004 | Schofield et al. | |
| 6,850,156 B2 | 2/2005 | Bloomfield et al. | |
| 6,889,161 B2 | 5/2005 | Winner et al. | |
| 6,903,670 B1* | 6/2005 | Lee | H03M 1/1038 |
| | | | 341/118 |
| 6,909,753 B2 | 6/2005 | Meehan et al. | |
| 6,946,978 B2 | 9/2005 | Schofield | |
| 6,975,775 B2 | 12/2005 | Rykowski et al. | |
| 6,989,736 B2 | 1/2006 | Berberich et al. | |
| 7,004,606 B2 | 2/2006 | Schofield | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,079,017 B2 | 7/2006 | Lang et al. | |
| 7,085,637 B2 | 8/2006 | Breed et al. | |
| 7,092,548 B2 | 8/2006 | Laumeyer et al. | |
| 7,111,968 B2 | 9/2006 | Bauer et al. | |
| 7,116,246 B2 | 10/2006 | Winter et al. | |
| 7,123,168 B2 | 10/2006 | Schofield | |
| 7,136,753 B2 | 11/2006 | Samukawa et al. | |
| 7,145,519 B2 | 12/2006 | Takahashi et al. | |
| 7,149,613 B2 | 12/2006 | Stam et al. | |
| 7,161,616 B1 | 1/2007 | Okamoto et al. | |
| 7,195,381 B2 | 3/2007 | Lynam et al. | |
| 7,202,776 B2 | 4/2007 | Breed | |
| 7,227,611 B2 | 6/2007 | Hull et al. | |
| 7,304,670 B1* | 12/2007 | Hussey | H04N 5/2176 |
| | | | 235/462.11 |
| 7,365,769 B1 | 4/2008 | Mager | |
| 7,375,803 B1 | 5/2008 | Bamji | |
| 7,425,988 B2 | 9/2008 | Okada et al. | |
| 7,460,951 B2 | 12/2008 | Altan | |
| 7,490,007 B2 | 2/2009 | Taylor et al. | |
| 7,526,103 B2 | 4/2009 | Schofield et al. | |
| 7,592,928 B2 | 9/2009 | Chinomi et al. | |
| 7,639,149 B2 | 12/2009 | Katoh | |
| 7,667,739 B2* | 2/2010 | Hsuan | H04N 5/57 |
| | | | 348/222.1 |
| 7,681,960 B2 | 3/2010 | Wanke et al. | |
| 7,720,580 B2 | 5/2010 | Higgins-Luthman | |
| 7,724,962 B2 | 5/2010 | Zhu et al. | |
| 7,855,755 B2 | 12/2010 | Weller et al. | |
| 7,881,496 B2 | 2/2011 | Camilleri et al. | |
| 7,952,490 B2 | 5/2011 | Fechner et al. | |
| 8,013,780 B2 | 9/2011 | Lynam et al. | |
| 8,027,029 B2 | 9/2011 | Lu et al. | |
| 8,446,470 B2 | 5/2013 | Lu et al. | |
| 8,849,495 B2 | 9/2014 | Chundrlik, Jr. et al. | |
| 2002/0015153 A1 | 2/2002 | Downs | |
| 2002/0113873 A1 | 8/2002 | Williams | |
| 2002/0196472 A1 | 12/2002 | Enomoto | |
| 2003/0107664 A1* | 6/2003 | Suzuki | H04N 5/235 |
| | | | 348/296 |
| 2003/0137586 A1 | 7/2003 | Lewellen | |
| 2003/0222982 A1 | 12/2003 | Hamdan et al. | |
| 2004/0051796 A1* | 3/2004 | Kelly | H04N 5/361 |
| | | | 348/243 |
| 2004/0114381 A1 | 6/2004 | Salmeen et al. | |
| 2004/0252208 A1* | 12/2004 | Lee | H04N 5/357 |
| | | | 348/241 |
| 2005/0140631 A1* | 6/2005 | Oh | G09G 3/3406 |
| | | | 345/89 |
| 2006/0018511 A1 | 1/2006 | Stam et al. | |
| 2006/0018512 A1 | 1/2006 | Stam et al. | |
| 2006/0028492 A1* | 2/2006 | Yamaguchi | G06F 3/14 |
| | | | 345/690 |
| 2006/0091813 A1 | 5/2006 | Stam et al. | |
| 2006/0103727 A1 | 5/2006 | Tseng | |
| 2006/0153450 A1 | 7/2006 | Woodfill et al. | |
| 2006/0164221 A1 | 7/2006 | Jensen | |
| 2006/0188018 A1* | 8/2006 | Lin | H04N 19/176 |
| | | | 375/240.16 |
| 2006/0221100 A1* | 10/2006 | Kao | G09G 3/2007 |
| | | | 345/690 |
| 2006/0228102 A1* | 10/2006 | Yang | H04N 5/3572 |
| | | | 396/213 |
| 2006/0244844 A1* | 11/2006 | Oizumi | H04N 5/243 |
| | | | 348/229.1 |
| 2006/0250501 A1 | 11/2006 | Wildmann et al. | |
| 2006/0262210 A1* | 11/2006 | Smith | H04N 5/3651 |
| | | | 348/308 |
| 2006/0290479 A1 | 12/2006 | Akatsuka et al. | |
| 2007/0041062 A1* | 2/2007 | Chinnaveerappan | H01L 27/1463 |
| | | | 358/513 |
| 2007/0071343 A1* | 3/2007 | Zipnick | G06T 5/50 |
| | | | 382/254 |
| 2007/0104476 A1 | 5/2007 | Yasutomi et al. | |
| 2007/0201738 A1 | 8/2007 | Toda et al. | |
| 2008/0068328 A1* | 3/2008 | Jou | G09G 3/3406 |
| | | | 345/102 |
| 2008/0118179 A1* | 5/2008 | Jeong | G06K 9/40 |
| | | | 382/275 |
| 2008/0151080 A1* | 6/2008 | Osaka | G06T 5/002 |
| | | | 348/241 |
| 2008/0204600 A1* | 8/2008 | Xu | H04N 5/144 |
| | | | 348/607 |
| 2008/0231710 A1 | 9/2008 | Asari et al. | |
| 2008/0239110 A1* | 10/2008 | Hara | H04N 5/3651 |
| | | | 348/241 |
| 2008/0266329 A1* | 10/2008 | Park | G09G 3/2003 |
| | | | 345/690 |
| 2009/0073327 A1* | 3/2009 | Watanabe | G01C 21/36 |
| | | | 348/837 |
| 2009/0093938 A1 | 4/2009 | Isaji et al. | |
| 2009/0113509 A1 | 4/2009 | Tseng et al. | |
| 2009/0177347 A1 | 7/2009 | Breuer et al. | |
| 2009/0201320 A1* | 8/2009 | Damberg | G09G 3/3426 |
| | | | 345/694 |
| 2009/0207274 A1 | 8/2009 | Park et al. | |
| 2009/0243824 A1 | 10/2009 | Peterson et al. | |
| 2009/0243986 A1* | 10/2009 | Jung | G09G 3/3406 |
| | | | 345/94 |
| 2009/0244361 A1 | 10/2009 | Gebauer et al. | |
| 2009/0265069 A1 | 10/2009 | Desbrunes | |
| 2010/0020170 A1 | 1/2010 | Higgins-Luthman et al. | |
| 2010/0073515 A1* | 3/2010 | Conard | G09B 21/008 |
| | | | 348/229.1 |
| 2010/0228437 A1 | 9/2010 | Hanzawa et al. | |
| 2010/0238355 A1* | 9/2010 | Blume | H04N 7/0132 |
| | | | 348/607 |
| 2010/0260432 A1* | 10/2010 | Shimizu | G06T 5/002 |
| | | | 382/255 |
| 2010/0265281 A1* | 10/2010 | Furukawa | G09G 3/3413 |
| | | | 345/691 |
| 2010/0271512 A1* | 10/2010 | Garten | G09G 5/06 |
| | | | 348/239 |
| 2011/0019031 A1* | 1/2011 | Tanigawa | H04N 5/2351 |
| | | | 348/234 |

(56) References Cited

U.S. PATENT DOCUMENTS

| | | | |
|---|---|---|---|
| 2011/0032394 A1* | 2/2011 | Peng | H04N 5/3595 348/248 |
| 2012/0002113 A1 | 1/2012 | Nishio et al. | |
| 2012/0026402 A1* | 2/2012 | Zhong | H04N 5/145 348/607 |
| 2012/0044066 A1 | 2/2012 | Mauderer et al. | |
| 2012/0062743 A1 | 3/2012 | Lynam et al. | |
| 2012/0154655 A1* | 6/2012 | Compton | H04N 5/3658 348/308 |
| 2012/0169936 A1* | 7/2012 | Persson | H04N 5/21 348/609 |
| 2012/0182332 A1* | 7/2012 | Liu | G09G 3/2007 345/691 |
| 2012/0188403 A1* | 7/2012 | Gomita | H04N 5/2351 348/226.1 |
| 2012/0201454 A1* | 8/2012 | Sato | H04N 9/646 382/167 |
| 2012/0212652 A1* | 8/2012 | Hsu | G06T 5/002 348/241 |
| 2012/0218412 A1 | 8/2012 | Dellantoni et al. | |
| 2012/0262340 A1 | 10/2012 | Hassan et al. | |
| 2012/0293660 A1* | 11/2012 | Murakami | B60R 1/00 348/148 |
| 2013/0120478 A1* | 5/2013 | Ishihara | G09G 3/2022 345/690 |
| 2013/0124052 A1 | 5/2013 | Hahne | |
| 2013/0129150 A1 | 5/2013 | Saito | |
| 2013/0131918 A1 | 5/2013 | Hahne | |
| 2013/0229498 A1* | 9/2013 | Yano | H04N 13/122 348/51 |
| 2013/0321672 A1* | 12/2013 | Silverstein | H04N 5/365 348/241 |
| 2013/0321679 A1* | 12/2013 | Lim | H04N 5/23229 348/256 |
| 2013/0322746 A1* | 12/2013 | Cote | G06T 1/20 382/163 |
| 2013/0335601 A1* | 12/2013 | Shiota | H04N 5/2173 348/247 |
| 2014/0067206 A1 | 3/2014 | Pflug | |
| 2014/0156157 A1 | 6/2014 | Johnson et al. | |
| 2014/0222280 A1 | 8/2014 | Salomonsson | |
| 2014/0307095 A1 | 10/2014 | Wierich | |
| 2014/0313339 A1 | 10/2014 | Diessner et al. | |
| 2014/0349220 A1* | 11/2014 | Moon | G03F 7/0007 430/7 |
| 2014/0368654 A1 | 12/2014 | Wierich | |
| 2014/0379233 A1 | 12/2014 | Chundrlik, Jr. et al. | |
| 2015/0002689 A1* | 1/2015 | Weissman | H04N 5/2355 348/222.1 |
| 2015/0312499 A1* | 10/2015 | Panicacci | H04N 5/378 348/251 |
| 2016/0137126 A1 | 5/2016 | Fursich | |

* cited by examiner

```
  1,2-2,1      2,3-1,2    ...
     +            +
  3,2-4,1      4,3-3,2    ...
     +            +
  5,2-6,1      5,4-6,3    ...
     +            +
  7,2-8,1      7,4-8,3    ...
     +            +
  9,2-10,1     9,4-10,3   ...
     +            +
       ...
     +            +
  (n,3)-       (n,1,2)
  (n-1,2)      -(n-1)     ...
```

$$= \left| \frac{\sum differences_1}{c_1} \right| \left| \frac{\sum differences_2}{c_2} \right| \cdots$$

$$= \left| D_1 \right| \left| D_2 \right| \cdots$$

VEHICLE VISION SYSTEM WITH REDUCTION OF TEMPORAL NOISE IN IMAGES

CROSS REFERENCE TO RELATED APPLICATIONS

The present application claims the filing benefits of U.S. provisional applications, Ser. No. 61/919,138, filed Dec. 20, 2013, and Ser. No. 61/864,835, filed Aug. 12, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides an algorithm that is applied to image data captured an imaging array of photosensing pixels of the camera, with the algorithm determining and reducing temporal noise in the captured image data.

According to an aspect of the present invention, the system may reduce the temporal noise by making a pixel-wise or photosensor element-wise comparison of consecutive frames of captured image data. If a pixel illumination value or luminance value (such as the luminance value of individual pixels from one frame to a subsequent frame or such as the luminance value of groups of pixels, such as a group comprising a red pixel, a green pixel and a blue pixel, from one frame to a subsequent frame) jumps or spikes (in the range of a noise spike), the jump is dampened by not fully adopting its change (such as by weighting the values of those pixels with pixel values of those pixels from the other frame or frames of captured image data). If there is a substantial increase or spike in luminance value (for any given individual pixel or group of pixels), the increase may be indicative of a real change in luminance value at the scene that is being imaged, so the adoption ratio gets increased to weight the jumped or spiked value accordingly. Thus, noise changes may get filtered out or smoothed while substantial changes (not indicative of noise) will not be filtered out or ignored.

According to another aspect of the present invention, the system may address or reduce fix pattern noise (FPN) caused by dark Signal non uniformity (DSNU), which appears column wise in the captured image data, and may comprise a steady offset in luminance. By column-wise comparing the green photosensing elements (since green bears illuminance) of a column with a neighboring column and averaging the luminance differences, the base offset of that column can be found and corrected by subtracting it from the values of all of the photosensing elements in that column.

These and other objects, advantages, purposes and features of the present invention will become apparent upon review of the following specification in conjunction with the drawings.

BRIEF DESCRIPTION OF THE DRAWINGS

FIGS. 6-9 show the operation of the algorithm of the present invention;

FIG. 11A is a table of values of an array in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
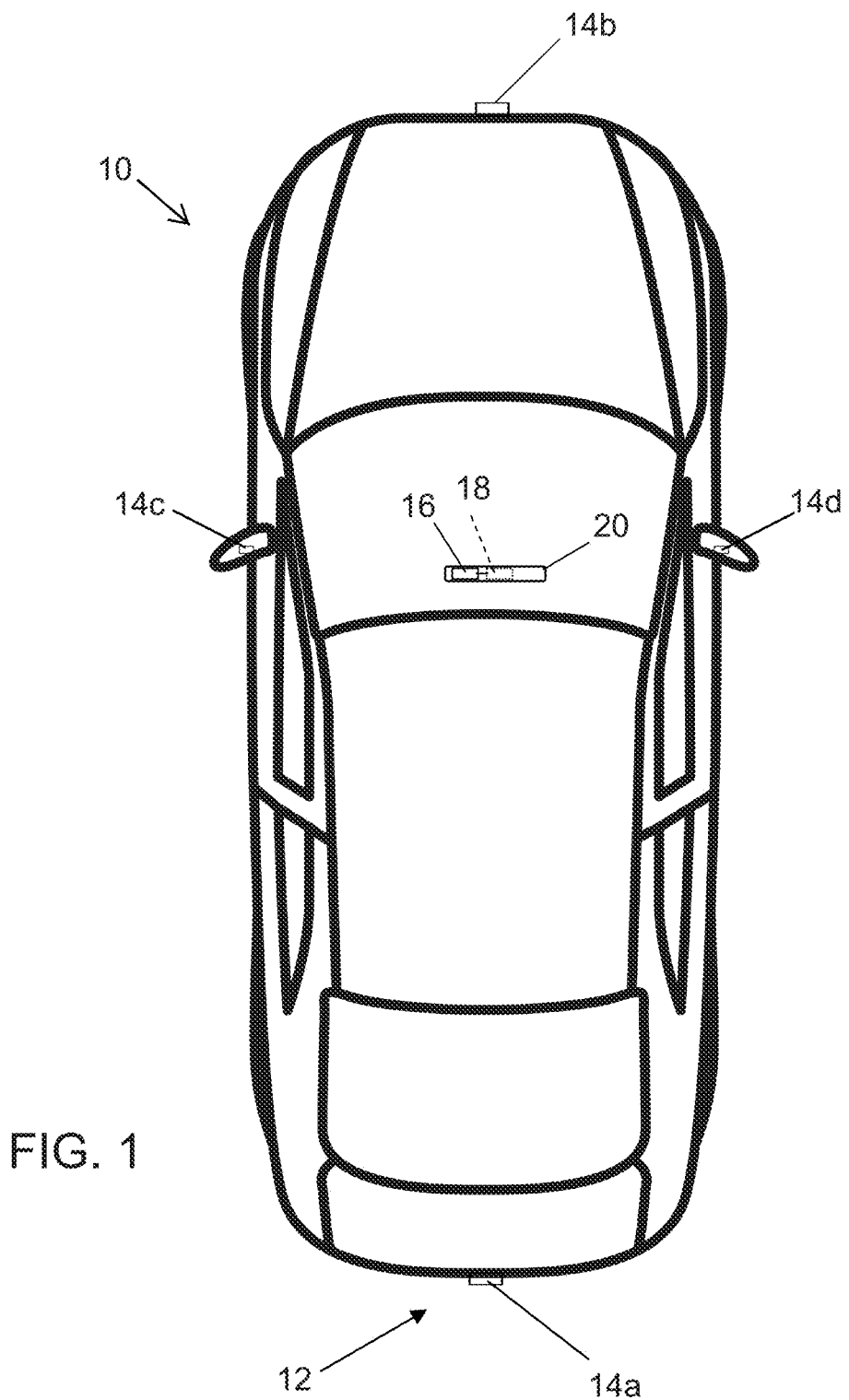
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

There are several methods for reducing pixel noise of images captured by imagers. Most are meant for post shot processing of single shots commodity cameras. These are either executed on image enhancement PC programs or in the commodity camera. Both do not require working fast. When enhancing a real time video data stream images there is typically just the time between two consecutive frames, typically less, for executing a noise reduction measure. Because of this, typical noise reduction methods for post shot processing don't apply for real time video image data stream image enhancing.

There are two basic approaches to noise filtering of images: temporal filtering and spatial filtering. There are filters that do both. Spatial filtering often comes or is based on a blurring effect by averaging a to-be-de-noised pixel with its neighborhood pixels. Spatial-temporal filters combine to exploit the neighborhood pixels time domain and frequency domain. Some are based on wavelet based shrinkage [see, for example, Aleksandra Pizurica; Vladimir Zlokolica; Wilfried Philips; Noise Reduction in Video Sequences Using Wavelet-Domain and temporal filtering, which is hereby incorporated herein by reference in its entirety].

Known temporal filters either show problems on fast moving objects through the image (due to inherent statistical adaption time constants) or require motion determination. In there, rapidly changing regions become spared from temporal filtering but just filtering a steady background [see, for example, Olgierd Stankiewicz; Antoni Roszak; Adam Łuczak; Temporal Noise Shaping, Quantization and Coding Methods in Perceptual Audio Coding A Tutorial Introduction, which is hereby incorporated herein by reference in its entirety]. This method is comparably poor when high motion is within the image scene as such when a vehicle camera is capturing the motion flow during driving.

The present invention provides an algorithm for temporal noise reduction (TNR) lean in memory space and computing time is suggested. It is well implementable on DSPs, GPUs and processor programs, but is limited in FPGA applications due to its required memory access.

Input is the luminance of pixels at the same position. One way to calculate the luminance is L=0.3 R+0.6 G+0.1 B (RGB color room).

There may be memory allocated having the identical size as a full single image coming from a video camera. All images have a certain size in spatial and resolution per pixel dimension.

A first image $I_n$ (at time step n so one frame later is referred as $I_{n-1}$) coming from the camera may be stored unaltered in that memory which may be called 'pixel-accumulator' later on referred as PA.

A consecutive (one time step n so a frame later) image $I_n$ coming from the camera is compared to the image in the $PA_{n-1}$ by pixel wise subtracting the new image $I_n$ from $PA_{n-1}$ and forming the absolute value of the result afterwards. The resulting difference may be called delta '$D_n$', see equation (1) below.

$$D_n = |(PA_{n-1} - I_n)| \quad (1)$$

At times D may be smaller than a certain threshold (off luminance change) $T_n$. The fraction of the new image $I_n$ carried over to $PA_n$ may be different than when $D_n$ may be higher than $T_n$. As a preferred embodiment of the present invention, the fraction of $I_n$ carried over to $PA_n$ may be substantially higher when $D_n$ may be higher than $T_n$ as when $D_n$ may be lower than $T_n$. As a more specific example of the present invention, when $D_n < T_n$, then the new value $PA_n$ may be a blend of about 10 percent of the value of the new camera image $I_n$ and about 90 percent of the old value of $PA_{n-1}$ (see equation (2) below), and when $D_n > T_n$, the new value $PA_n$ may be a blend of about 70 percent of the value of the new camera image $I_n$ and about 30 percent of the old value of $PA_{n-1}$ (see equation (3) below). The blending is done in the actual image format such as RGB.

$$PA_n = 0.9 \cdot PA_{n-1} + 0.1 \cdot I_n; D_n < T_n \quad (2)$$

$$PA_n = 0.3 \cdot PA_{n-1} + 0.7 \cdot I_n; D_n > T_n \quad (3)$$

D as intermediate result can be eliminated;

$$PA_n = 0.9 \cdot PA_{n-1} + 0.1 \cdot I_n; |(PA_{n-1} - I_n)| < T_n \quad (4)$$

$$PA_n = 0.3 \cdot PA_{n-1} + 0.7 \cdot I_n; |(PA_{n-1} - I_n)| > T_n \quad (5)$$

The output to the further image processing or display at the time step n will then be the pixel-accumulator itself: $PA_n$. The algorithm above describes a temporal filter. The possibility of using filters of any order or a Kalman filter may be incorporated in the present invention. The dependency of the update factor from the difference between current luminance and PA ensures that a rapid change in luminance becomes dominant faster than changes that are small, such as just noise. Rapid changes in luminance may be caused by light sources or reflections moving through the image (typically mainly caused by the ego motion [of the own or subject or equipped vehicle]). Slow adaption to the new values instead would cause follow marks/feathers especially of bright image parts which cross a dark image region.

$$PA_n = kol \cdot PA_{n-1} + knl \cdot I_n; D_n < T_n \quad (6)$$

$$PA_n = koh \cdot PA_{n-1} + knh \cdot I_n; D_n > T_n \quad (7)$$

Equations (6) and (7) show the general form with its parameters kol (old low), knl (new low), koh (old high) and knh (new high). These parameters and the threshold T may be optimized in any kind of evolutional or hill climbing algorithm. When using other filters or higher order filters, these filter parameters may be optimized in any kind of evolutional or hill climbing algorithm. In all cases, the optimization may run during operation time or offline or is partially preprocessed and partially done during run time.

As another aspect of the present invention, the parameter set may be adaptively changing on different light conditions. This may happen in steps or may be interleaved. Optionally, the threshold T may be dependent to the overall image luminance or to local regions luminance level. Optionally, the algorithm may just run at comparably low light conditions and may be off at bright light condition. Optionally, the algorithm may only effect low light image regions within an image while comparably bright illuminated regions are untouched. Optionally, the algorithm may be a subcontrol of an HDR control.

Figure 2:
FIG. 2 is a noisy color image or frame of a night scene captured by an automotive vehicle front camera while the vehicle is in motion.
Figure 3:
FIG. 3 is a temporal noise reduced color image as a result of an algorithm in accordance with the present invention.

FIGS. 2 and 3 show how the algorithm according to the present invention achieves to substantially reduce the temporal noise. FIG. 2 is a noisy color image (frame out of a video stream) of a night scene (partially bright, partially dark) shown in gray tones as source image captured by an automotive vehicle front camera while the vehicle is in motion. FIG. 3 is a temporal noise reduced color image shown in gray tones as a result of the algorithm according to the present invention, such as described above.

In the implementation of the present invention as described above, there were two fraction ratios of $PA_{n-1}$ to $I_n$ depending on being above or below a single threshold. As a more advanced implementation of the present invention, the multiplier 'c' (carry over) as fraction ratio of $PA_{n-1}$ and (1-c) (accumulate newly) as a fraction ratio of $I_n$ may be set in a relation of D the and the Signal to Noise Ratio (SNR); $c_n$=R ($D_n$, SNR), see equation (8) below. While $PA_n$ and $D_n$ are calculated pixel-wise, the SNR is determined in general for the whole image.

$$PA_n = c_n \cdot PA_{n-1} + (1 - c_n) \cdot I_n; \quad (8)$$
$$c_n = R(D_n, SNR)$$

$$; D_n = |(PA_{n-1} - I_n)| \quad (1)$$
$$; SNR = f(\vartheta, \text{gain})$$

Figure 11A:
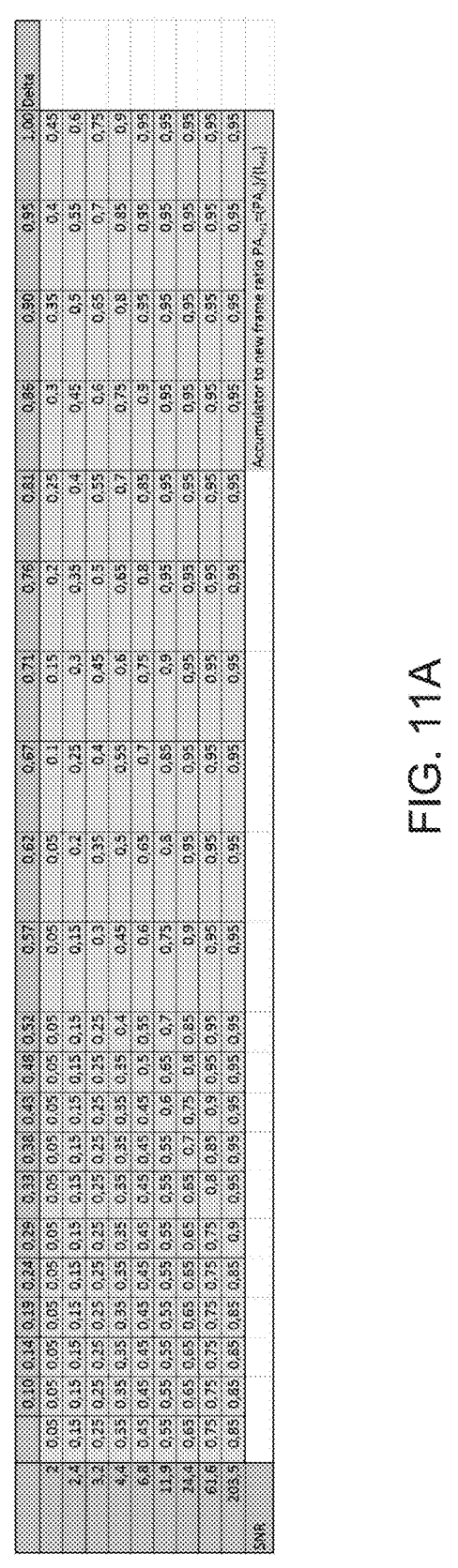
Figure 11B:
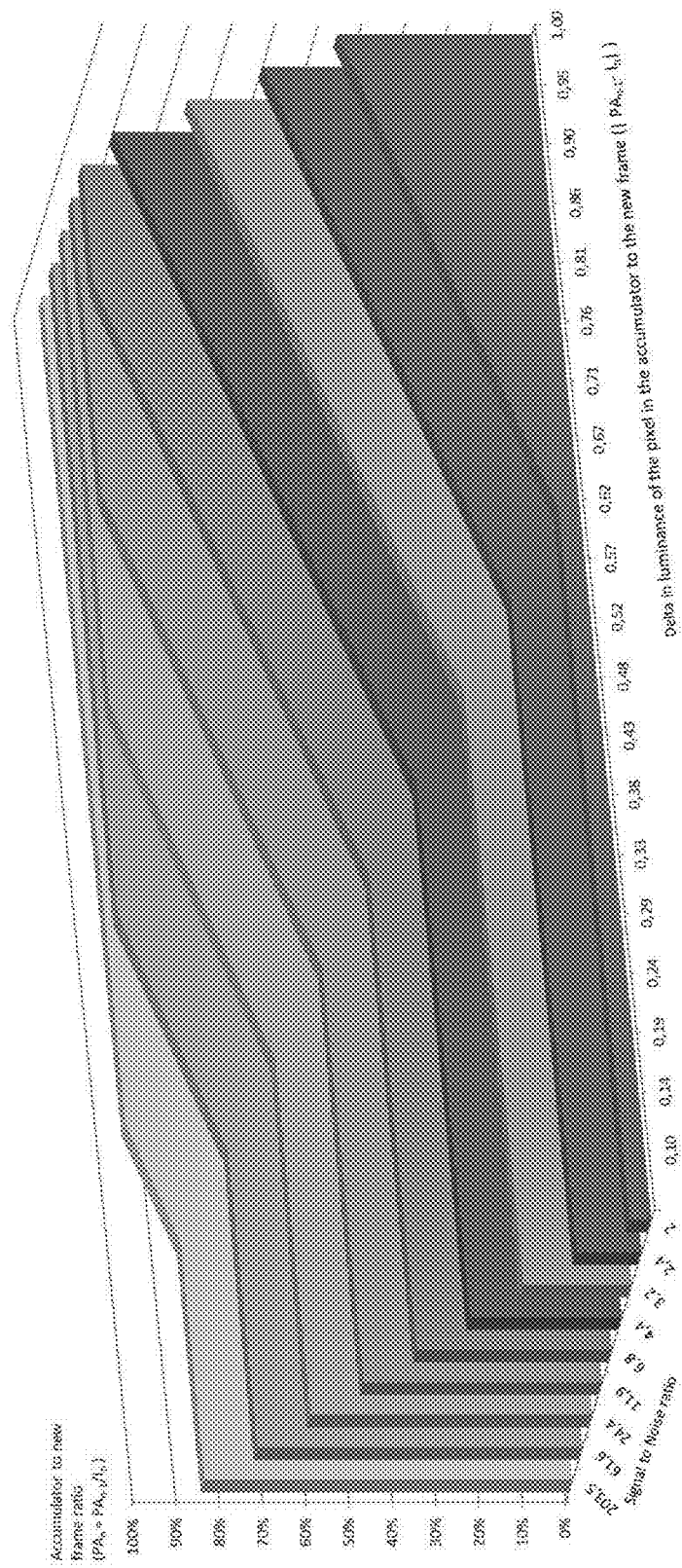
FIG. 11B is a graph of the array of the present invention.

The relation may be given by a characteristic field array in the system's memory. An example of such an array is shown in FIGS. 11A and 11B.

The characteristic field array's entries may be entered according to known imager parameters and a measurement of the noise level dependent on the temperature.

During run time, in case the imager provides a proper temperature signal, the Signal to Noise Ratio (SNR) is directly ascertainable out of the imager's parameter data and the current gain level, if not there may be optional thermal models implemented to estimate the imager's temperature. The thermal models may be based on start-up temperature (assumed similar to a known temperature of a near device), run time, outside temperature, current consumption and heat resistance of the camera.

Optionally, the algorithm may run at comparably low light conditions and may be off during bright light conditions. Optionally, the algorithm may only effect low light image regions within an image while comparably bright illuminated regions are untouched. Optionally, the algorithm may be a subcontrol of an HDR control.

It strikes the eye that some vertical shape like noise is still remaining in the image of FIG. 3. As another aspect of the present invention, there may be an additional or alternative (as standalone without TNR) algorithm in place to address image noise present non stochastically but more or less statically called 'Fix pattern noise' (FPN) ('fix pattern' since the noise offset stays in a steady pattern). One of the causes for FPN is the imager's hardware structure. Each column of pixels possesses one amplifier. In practice, these amplifier have a Dark Signal Non Uniformity (DSNU) in the region of five to ten percent. With the Bayer pattern (of common RGB imagers) pixel array, a column may possess red and green pixels in alternation or alternating blue and green. In RGB, green is typically the dominating color which usually incorporates the majority of the luminance level, such that, for simplification, green can be handled as to be the luminance.

Figure 6:
Figure 7:
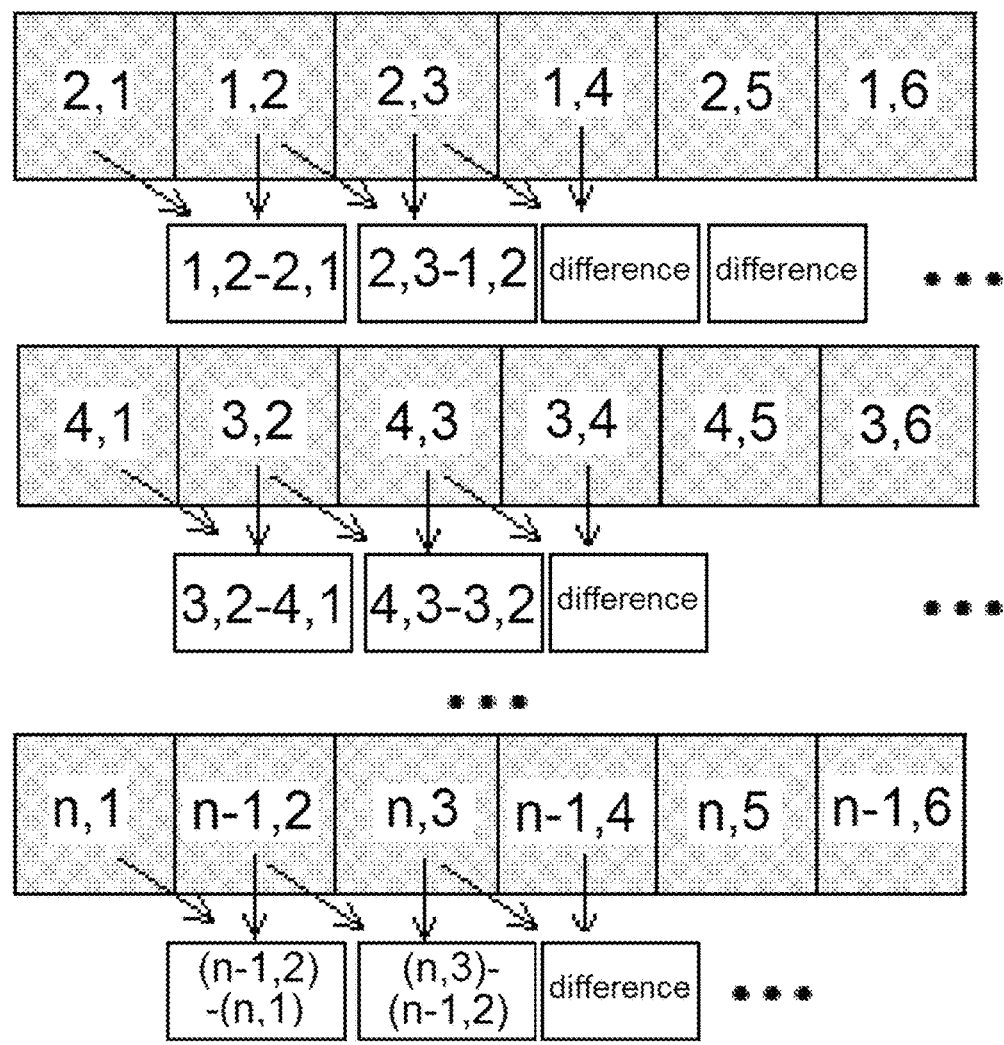
Figure 9:
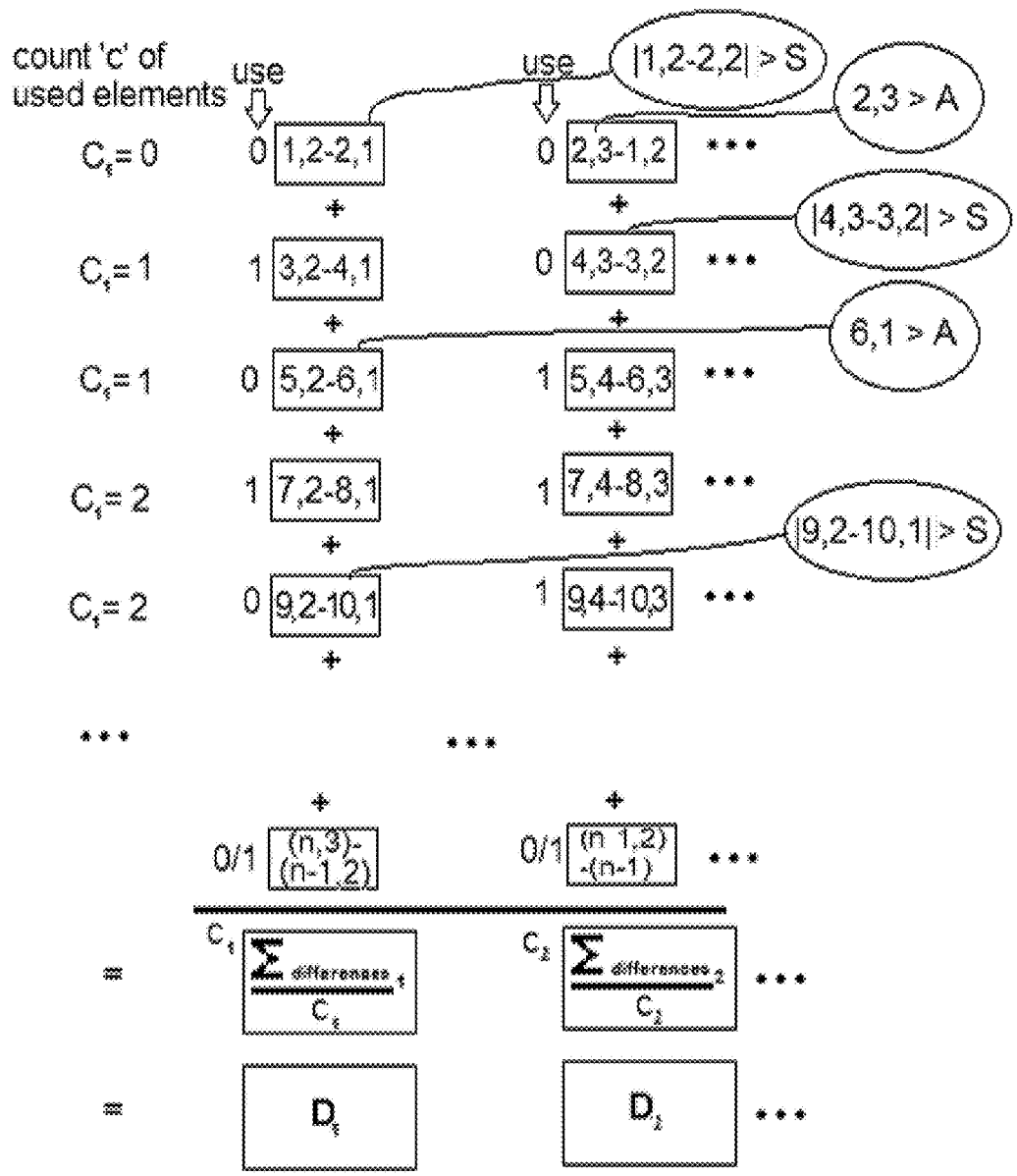
Figure 10:
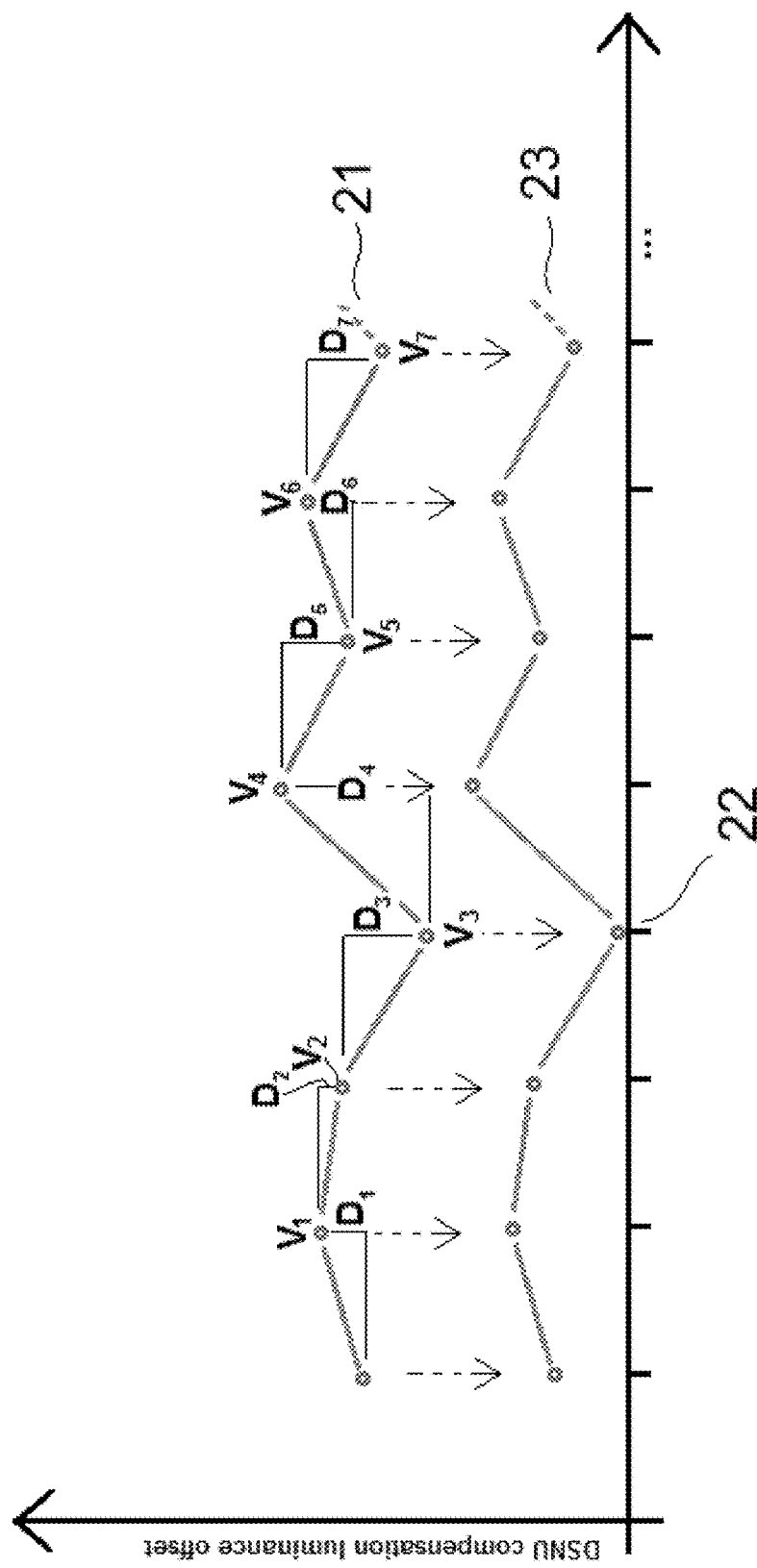
FIG. 10 is a graph showing a curve of the luminance.

The FPN reduction (FPNR) algorithm of the present invention may compare all green values as luminance measure '$I_k$' of one column 'k' with its diagonal right neighbor column 'k+1' by subtracting from another in pairs (see, for example, FIGS. 6 and 7). Then the (used) differences are summed up and divided by the total number of (used) lines resulting $D_k$ as being the average of the luminance difference. This is done for all columns 'm' (see FIG. 8). The operation may only be done when the luminance of the specific pixels is below a certain threshold A (for processing dark areas only) and the absolute difference of two diagonal neighboring pixel pair $|I_k-I_{k+1}|$ is below a certain value S (for preventing high contrast regions from being equalized). That reduces the number of used difference elements which incur to the mean value of differences $D_k$, with c being the count of used elements in a column (see equation (9) below and FIG. 9).

$$D_k = \sum_{1}^{n} \frac{(I_{k+1_n} - I_{k_{n+1}})}{c} \quad (9)$$

from $k = 1$ to $k = m$;

in case: $I_{k_{n+1}}$<A; $I_{k_{n+1}}$<A;

By summing all left neighbors plus the current mean difference $D_0$+ . . . +$D_k$ of a column k with k=1 to k=m, a curve of the luminance 21 is reconstructed. The curves lowest point 22 in FIG. 10 (which may be any of it) is then set as baseline.

For reducing the fix pattern noise during run time, the resulting luminance value $V_k$ at a given column (k) in the curve 23 will be subtracted from each pixel of this column independent of its color.

Figure 4:
FIG. 4 is a FPNR color image shown in gray tones as a result of the FPNR algorithm in accordance with the invention as described (in the second section) above, having FIG. 2 as input source.

FIG. 4 is a FPNR color image shown in gray tones as a result of the FPNR algorithm according the invention as described (in the second section) above having FIG. 2 as input source.

Figure 5:
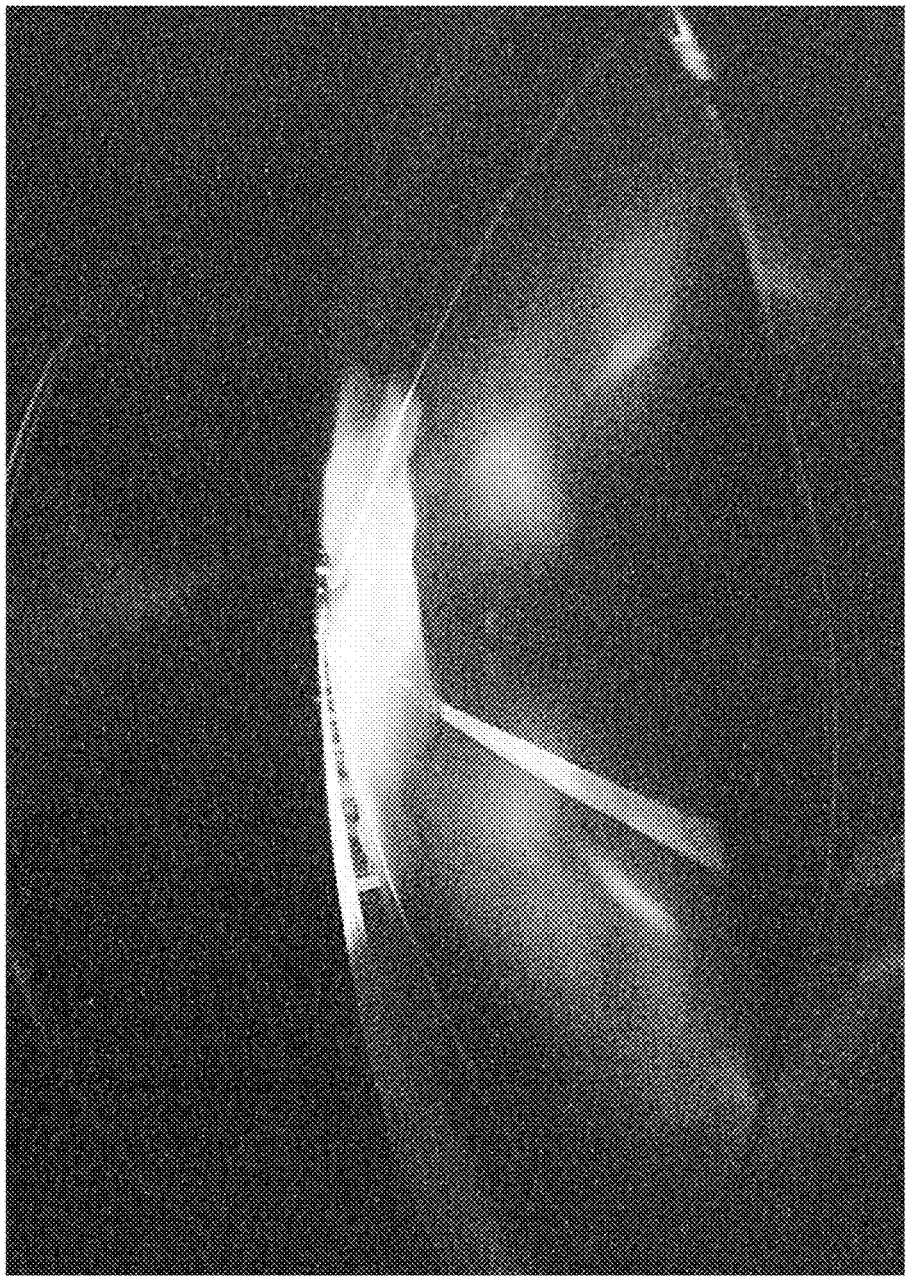
FIG. 5 is a FPNR and TNR color image shown in gray tones as a result of combining the TNR algorithm and FPNR algorithm in accordance with the present invention.

FIG. 5 is a FPNR and TNR color image shown in gray tones as a result of combining the TNR algorithm and FPNR algorithm in accordance with the present invention as described (in the first and second section) above. FIG. 3 is already processed by the TNR algorithm and is the source for the FPNR algorithm.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or PCT Application No. PCT/US2014/042229, filed Jun. 13, 2014, and published Dec. 24, 2014 as International Publication No. WO 2014/204794, and/or U.S. patent application Ser. No. 14/324,696, filed Jul. 7, 2014, now U.S. Pat. No. 9,701,258; Ser. No. 14/369,229, filed Jun. 27, 2014, now U.S. Pat. No. 9,491,342; Ser. No. 14/316,940, filed Jun. 27, 2014, and published Jan. 8, 2015 as U.S. Patent Publication No. US-2015-0009010; Ser. No. 14/316,939, filed Jun. 27, 2014, and published Jan. 1, 2015 as U.S. Patent Publication No. US-2015-0002670; Ser. No. 14/303,696, filed Jun. 13, 2014, now U.S. Pat. No. 9,609,757; Ser. No. 14/303,695, filed Jun. 13, 2014, and published Dec. 25, 2014 as U.S. Patent Publication No. US-2014-0375476; Ser. No. 14/303,694, filed Jun. 13, 2014, now U.S. Pat. No. 9,260,095; Ser. No. 14/303,693, filed Jun. 13, 2014, and published Dec. 18, 2014 as U.S. Patent Publication No. US-2014-0368654; Ser. No. 14/297,663, filed Jun. 6, 2014, and published Dec. 11, 2014 as U.S. Patent Publication No. US-2014-0362209; Ser. No. 14/362,636, filed Jun. 4, 2014, now U.S. Pat. No. 9,762,880; Ser. No. 14/290,028, filed May 29, 2014, now U.S. Pat. No. 9,800,794; Ser. No. 14/290,026, filed May 29, 2014, now U.S. Pat. No. 9,476,398; Ser. No. 14/359,341, filed May 20, 2014, now U.S. Pat. No. 10,071,687; Ser. No. 14/359,340, filed May 20, 2014, now U.S. Pat. No. 10,099,614; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published Nov. 6, 2014 as U.S. Patent Publication No. US-2014-0327772; Ser. No. 14/264,443, filed Apr. 29, 2014, and published Oct. 30, 2014 as U.S. Patent Publication No. US-2014-0320636; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published Aug. 7, 2014 as U.S. Patent Publication No. US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published Aug. 7 2014 as U.S. Patent Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Patent Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Patent Publication No. US-2014-0168437; Ser. No. 14/098,817, filed Dec. 6, 2013, and published Jun. 19, 2014 as U.S. Patent Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Patent Publication No. US-2014-0025240; Ser. No. 13/942,753, filed Jul. 16, 2013, and published Jan. 30, 2014 as U.S. Patent Publication No. US-2014-0028852; Ser. No. 13/927,680, filed Jun. 26, 2013, and published Jan. 2, 2014 as U.S. Patent Publication No. US-204-00015907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, and published Aug. 29, 2013 as U.S. Patent Publication No. US-2013-0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Patent Publication No. US-2013-0278769; Ser. No. 13/847,815, filed Mar. 20, 2013, and published Oct. 31, 2013 as U.S. Patent Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,143,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Patent Publication No. US-2013-0002873, and/or U.S. provisional applications, Ser. No. 62/018,868, filed Jun. 30, 2014; Ser. No. 62/018,867, filed Jun. 30, 2014; Ser. No. 62/010,597, filed Jun. 11, 2014; Ser. No. 62/010,596, filed Jun. 11, 2014; Ser. No. 62/007,542, filed Jun. 4, 2014; Ser. No. 62/006,391, filed Jun. 2, 2014; Ser. No. 62/003,734, filed May 28, 2014; Ser. No. 62/001,796, filed May 22, 2014; Ser. No. 62/001,796, filed May 22, 2014; Ser. No. 61/993,736, filed May 15, 2014; Ser. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,056, filed Feb. 3, 2014; Ser. No. 61/935,055, filed Feb. 3, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/879,837, filed Sep. 19, 2013; Ser. No. 61/875,351, filed Sep. 9, 2013; Ser. No. 61/869,195, filed. Aug. 23, 2013; Ser. No. 61/864,836, filed Aug. 12, 2013; Ser. No. 61/864,838, filed Aug. 12, 2013 and/or Ser. No. 61/844,173, filed Jul. 9, 2013; which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No.

60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, now U.S. Pat. No. 9,264,672, which are hereby incorporated herein by reference in their entireties 7,255,451 and/or U.S. Pat. No. 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

a camera disposed at a vehicle and having a field of view exterior of the vehicle;

wherein said camera comprises an imaging array having rows and columns of photosensing elements;

an image processor operable to process image data captured by said camera;

a display disposed in the vehicle and viewable by a driver of the vehicle, wherein said display is operable to display images derived from captured image data;

wherein, responsive to image processing of captured image data by said image processor, temporal noise in displayed images derived from captured image data is reduced by determining a change in luminance values of photosensing elements from a first frame of captured image data to a second frame of captured image data and adjusting luminance values of photosensing elements for the displayed derived image responsive, at least in part, to the determined change in luminance of photosensing elements being above or below a threshold change;

wherein, responsive to a determined change in a luminance value of a photosensing element being less than the threshold change from the first frame of captured image data to the second frame of captured image data, the change in luminance value for that photosensing element is dampened so as to not fully adopt the luminance value of that photosensing element of the second frame of captured image data for the displayed images; and wherein the threshold change is adjusted responsive to a determined ambient light level at the vehicle.

2. The vision system of claim 1, wherein said imaging array comprises red photosensing elements, green photosensing elements and blue photosensing elements, and wherein a change in luminance values is determined for groups of red, green and blue photosensing elements from a first frame of captured image data to a second frame of captured image data.

3. The vision system of claim 1, wherein, responsive to the determined change in luminance values of photosensing elements being greater than the threshold change, the change in luminance values is dampened via a first weighting ratio and, responsive to the determined change in luminance values of photosensing elements being less than the threshold change, the change in luminance values is dampened via a second weighting ratio, and wherein said first weighting ratio has a greater weighting of luminance values of said second frame of captured image data than said second weighting ratio.

4. The vision system of claim 3, wherein said first weighting ratio is about 3:7 and said second weighting ratio is about 9:1.

5. The vision system of claim 3, wherein said first and second weighting ratios are selected to ensure that a substantial change in luminance of photosensing elements is represented in the displayed derived image and a small change in luminance of photosensing elements is not substantially represented in the displayed derived image.

6. The vision system of claim 1, wherein said vision system addresses temporal noise present randomly in captured image data.

7. The vision system of claim 1, wherein an algorithm addresses fix pattern noise present statically in captured image data.

8. The vision system of claim 7, wherein said algorithm (i) compares common color values of one column of photosensing elements with diagonal neighboring photosensing elements of the current frame by subtracting from another in pairs, and (ii) sums and divides by the total number of lines to determine an average luminance difference, and wherein the average luminance difference is used to determine and reduce fix pattern noise.

9. The vision system of claim 8, wherein the fix pattern noise is reduced by subtracting the average luminance difference from individual photosensing elements in said column of photosensing elements.

10. The vision system of claim 1, wherein a parameter set of said vision system adaptively changes in different light conditions.

11. The vision system of claim 1, wherein a parameter set of said vision system adaptively changes in different signal to noise ratio conditions of said imaging array.

12. The vision system of claim 11, wherein said parameter set of said vision system comprises a first weighted ratio applied responsive to the determined change in luminance values of photosensing elements being greater than the threshold change and a second weighted ratio applied responsive to the determined change in luminance of photosensing elements being less than the threshold change.

13. The vision system of claim 1, wherein said image processor operates to reduce temporal noise during lower lighting conditions and does not operate to reduce temporal noise during higher lighting conditions.

14. The vision system of claim 1, wherein said image processor operates to reduce temporal noise in a portion of the derived image while not reducing temporal noise in other portions of the derived image.

15. The vision system of claim 14, wherein said portion of the derived image comprises a lower light level region and said other portions of the derived image comprise higher light level regions.

16. A vision system of a vehicle, said vision system comprising:

a camera disposed at a vehicle and having a field of view exterior of the vehicle;

wherein said camera comprises an imaging array having rows and columns of photosensing elements, and wherein said imaging array comprises red photosensing elements, green photosensing elements and blue photosensing elements;

an image processor operable to process image data captured by said camera;

a display disposed in the vehicle and viewable by a driver of the vehicle, wherein said display is operable to display images derived from captured image data;

wherein, responsive to image processing of captured image data by said image processor, temporal noise in displayed images derived from captured image data is reduced by determining a change in luminance of individual red, green and blue photosensing elements from a first frame of captured image data to a second frame of captured image data and adjusting luminance values of red, green and blue photosensing elements for the displayed derived image responsive, at least in part, to the determined change in luminance values of individual red, green and blue photosensing elements being above or below a threshold change;

wherein, responsive to a determined change in a luminance values of individual photosensing elements being less than the threshold change from the first frame of captured image data to the second frame of captured image data, the change in luminance values for those photosensing elements is dampened via a first dampening ratio so as to not fully adopt the luminance value of the those photosensing elements of the second frame of captured image data for the displayed images;

wherein, responsive to the determined change in luminance values of individual photosensing elements being greater than the threshold change, the change in luminance values for those photosensing elements is dampened via a second dampening ratio;

wherein the first dampening ratio provides a greater dampening of luminance values of said second frame of captured image data than the second dampening ratio;

wherein the first and second dampening ratios are selected to ensure that a substantial change in luminance values of individual red, green and blue photosensing elements is represented in the displayed derived image and a small change in luminance of individual red, green and blue photosensing elements is not substantially represented in the displayed derived image; and wherein the threshold change is adjusted responsive to a determined ambient light level at the vehicle.

17. The vision system of claim 16, wherein the first and second dampening ratios are adjusted responsive to at least one of (i) changes in lighting conditions in the field of view of said camera and (ii) changes in signal to noise ratio conditions of said imaging array.

18. The vision system of claim 16, wherein said image processor operates to reduce temporal noise in a portion of the derived image while not reducing temporal noise in other portions of the derived image, and wherein said portion of the derived image comprises a lower light level region and said other portions of the derived image comprise higher light level regions.

19. A vision system of a vehicle, said vision system comprising:

a camera disposed at a vehicle and having a field of view exterior of the vehicle;

wherein said camera comprises an imaging array having rows and columns of photosensing elements and wherein said imaging array comprises red photosensing elements, green photosensing elements and blue photosensing elements;

an image processor operable to process image data captured by said camera;

a display disposed in the vehicle and viewable by a driver of the vehicle, wherein said display is operable to display images derived from captured image data;

wherein, responsive to image processing of captured image data by said image processor, temporal noise in displayed images derived from captured image data is reduced by determining a change in luminance values of photosensing elements from a first frame of captured image data to a second frame of captured image data and adjusting luminance values of photosensing elements for the displayed derived image responsive, at least in part, to the determined change in luminance values of photosensing elements being above or below a threshold change;

wherein luminance values of photosensing elements for the displayed derived image are adjusted by adjusting a dampening ratio of luminance values in said first frame of captured image data to luminance values in said second frame of captured image data;

wherein, responsive to a determined change in a luminance values of individual photosensing elements being less than the threshold change from the first frame of captured image data to the second frame of captured image data, the change in luminance values for those photosensing elements is dampened via a first dampening ratio so as to not fully adopt the luminance value of the those photosensing elements of the second frame of captured image data for the displayed images;

wherein, responsive to the determined change in luminance values of individual photosensing elements being greater than the threshold change, the change in luminance values for those photosensing elements is dampened via a second dampening ratio, and wherein the first dampening ratio provides a greater dampening of luminance values of said second frame of captured image data than the second dampening ratio;

wherein an algorithm addresses fix pattern noise present statically in captured image data;

wherein said algorithm (i) compares luminance values of green photosensing elements in one column of photosensing elements with diagonal neighboring green photosensing elements in another column of photosensing elements of the current frame by subtracting from another in pairs, and (ii) sums and divides by the total number of lines to determine an average change in luminance, and wherein the average change in luminance is used to determine and reduce fix pattern noise; and wherein the threshold change is adjusted responsive to a determined ambient light level at the vehicle.

20. The vision system of claim 19, wherein the fix pattern noise is reduced by subtracting the average luminance difference from photosensing elements in said column of photosensing elements.

* * * * *